(12) United States Patent
Ito

(10) Patent No.: US 10,477,145 B2
(45) Date of Patent: Nov. 12, 2019

(54) COMMUNICATION SYSTEM FOR REMOTE COMMUNICATION

(71) Applicant: CANON KABUSHIKI KAISHA, Tokyo (JP)

(72) Inventor: Yoshiharu Ito, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/980,711

(22) Filed: Dec. 28, 2015

(65) Prior Publication Data

US 2016/0212379 A1 Jul. 21, 2016

(30) Foreign Application Priority Data

Jan. 21, 2015 (JP) ................... 2015-009705

(51) Int. Cl.
| | |
|---|---|
| *H04N 7/15* | (2006.01) |
| *H04L 12/18* | (2006.01) |
| *H04L 29/06* | (2006.01) |
| *G06F 3/01* | (2006.01) |
| *G06F 3/0488* | (2013.01) |
| *G06F 3/042* | (2006.01) |
| *G06F 3/0482* | (2013.01) |

(52) U.S. Cl.
CPC ............. *H04N 7/15* (2013.01); *G06F 3/01* (2013.01); *G06F 3/011* (2013.01); *G06F 3/0421* (2013.01); *G06F 3/0482* (2013.01); *G06F 3/0488* (2013.01); *H04L 12/1813* (2013.01); *H04L 12/1822* (2013.01); *H04L 65/00* (2013.01); *H04L 65/1089* (2013.01); *H04L 65/403* (2013.01); *H04L 65/4015* (2013.01); *G06F 2203/0383* (2013.01); *G06F 2203/04804* (2013.01)

(58) Field of Classification Search
CPC combination set(s) only.
See application file for complete search history.

(56) References Cited

U.S. PATENT DOCUMENTS

| | | | |
|---|---|---|---|
| 8,040,536 B2 | 10/2011 | Ito et al. | ................ 358/1.13 |
| 8,355,038 B2* | 1/2013 | Robinson | ............ G06F 3/04883 |
| | | | 348/14.01 |
| 9,219,878 B2* | 12/2015 | Robinson | ................. H04N 7/15 |
| 2004/0155902 A1* | 8/2004 | Dempski | ................. G06F 3/017 |
| | | | 715/757 |
| 2008/0106629 A1* | 5/2008 | Kurtz | .................... H04N 7/144 |
| | | | 348/333.01 |

(Continued)

FOREIGN PATENT DOCUMENTS

ES 2399263 A1 3/2013

*Primary Examiner* — Duc Nguyen
*Assistant Examiner* — Assad Mohammed
(74) *Attorney, Agent, or Firm* — Venable LLP

(57) ABSTRACT

A communication system superimposes a mirror-image video obtained at another site and a document image on each other and projects the video and the document image on a screen. The direction and amount of movement of the projected document image are obtained upon detection of an instruction to move the display position of the document image. Then, both the projected video and document image are moved in the obtained direction of movement by an amount corresponding to the obtained amount of movement. Also, the obtained direction and amount of movement are transmitted to the other site.

13 Claims, 12 Drawing Sheets

(56) References Cited

U.S. PATENT DOCUMENTS

| | | | |
|---|---|---|---|
| 2010/0153497 A1* | 6/2010 | Sylvain | H04N 7/15 709/204 |
| 2010/0321323 A1* | 12/2010 | Kim | G06F 3/0418 345/173 |
| 2012/0176401 A1* | 7/2012 | Hayward | G06T 3/0093 345/619 |
| 2013/0093838 A1* | 4/2013 | Tan | H04N 7/144 348/14.16 |
| 2013/0132885 A1* | 5/2013 | Maynard | G06F 3/04883 715/777 |
| 2013/0234934 A1* | 9/2013 | Champion | G06F 3/012 345/156 |
| 2014/0232816 A1* | 8/2014 | Wilson | H04N 7/157 348/14.08 |
| 2015/0143261 A1* | 5/2015 | Marushima | H04L 65/403 715/753 |

* cited by examiner

10 SEMITRANSPARENT SCREEN

400 PERSON VIDEO DATA

450 PERSON VIDEO DATA OF MIRROR-IMAGE

20 SEMITRANSPARENT SCREEN

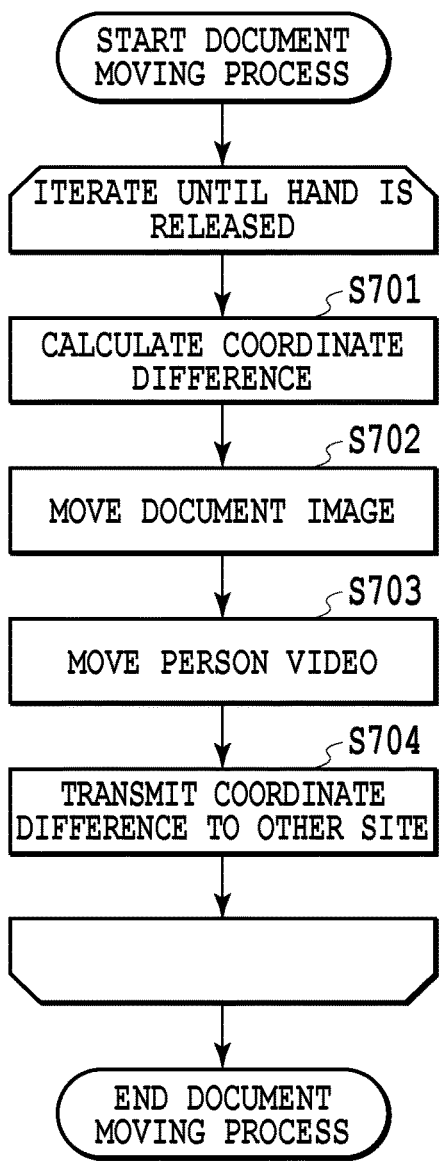
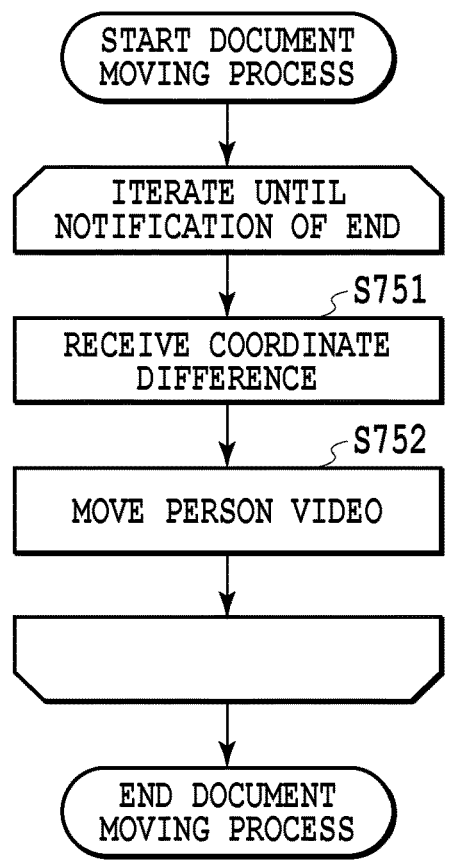
FIG.7A
FIG.7B

COMMUNICATION SYSTEM FOR REMOTE COMMUNICATION

BACKGROUND OF THE INVENTION

Field of the Invention

The present invention relates to a technique for performing remote communication by using communication systems installed at different sites. More specifically, the present invention relates to a technique for performing communication while superimposing and displaying an image capturing what is happening at each site and an image of an electronic document or the like.

Description of the Related Art

To conduct a conference or a meeting at one's own site with another site at a remote location, teleconferencing systems are sometimes utilized. Each teleconferencing system uses a display apparatus including a camera and a microphone and is configured to create video and audio data by capturing an image of a person in front of the display apparatus and collecting his or her voice and transmit the data to the other site through a network. At the other site, upon receipt of the data, the video data is displayed on the display apparatus and the audio data is reproduced through a speaker. By performing these processes at each site, each person can discuss with the other person at the remote location while seeing his or her expression.

Meanwhile, Spanish Patent No 2399263 (ES2399263, B1) proposes a system (hereinafter referred to as the conventional system) that allows smooth interaction between persons at different sites by exchanging an image of an electronic document in addition to images of the persons, superimposing and displaying the images of the persons and the electronic document, and having the persons communicate with each other while seeing the image of the electronic document at their own sites. In this conventional technique, as will be mentioned later, in a case where one changes the display position of the electronic document at his or her own site, the display position of the electronic document is synchronously changed at the other site as well. For this reason, the electronic document cannot be displayed at a desired position at each site.

SUMMARY OF THE INVENTION

A communication system according to the present invention is a communication system, including: a projection unit configured to superimpose a mirror-image video obtained at another site and a document image on each other and project the video and the document image on a display unit; a detection unit configured to detect an instruction from a user; an image capture unit configured to capture an image of the user situated to face a display surface of the display unit; an obtaining unit configured to obtain a direction and an amount of movement of the document image projected on the display unit in a case where the detection unit detects an instruction to move a display position of the document image; a control unit configured to move both the video and the document image projected by the projection unit in the direction obtained by the obtaining unit by an amount corresponding to the amount of movement obtained by the obtaining unit; and a transmission unit configured to transmit the direction and the amount of movement obtained by the obtaining unit to the other site.

Further features of the present invention will become apparent from the following description of exemplary embodiments (with reference to the attached drawings).

BRIEF DESCRIPTION OF THE DRAWINGS

FIGS. 7A and 7B are flowcharts each explaining a process of moving a displayed document image in Embodiment 1;

DESCRIPTION OF THE EMBODIMENTS

Embodiments of the present invention will be explained below.

In the conventional system, the positional relationship between the position of a person who is actually present at each site (hereinafter referred as the real person), the position of a person displayed on a screen (hereinafter referred to as the on-screen person), and the position of an image of an electronic document, is important. In the conventional system, as shown in FIGS. 2 and 3 of the Spanish Patent No 2399263, a camera and a projector are provided behind a semitransparent screen. The camera is used to capture an image of the person in front of the semitransparent screen, and the projector is used to project a video capturing the person present at the other site and the electronic document (hereinafter the electronic document will be referred to as the document image). A similar setting is provided at the other site as well. In this configuration, at one's own site, the on-screen person, who belongs to the other site, is projected on the semitransparent screen as a mirror image. Specifically, in a case where the real person in the other site is raising the left hand, the on-screen person, who is this real person belonging to the other site and displayed on the semitransparent screen at the one's own site, is raising the right hand.

Here, the surface of the semitransparent screen at each site which the real person there faces may be defined as a semitransparent-screen coordinate system in which the upper left corner of the semitransparent screen is set as the origin and the X and Y values increase toward the right and the bottom, respectively, from the origin. At both sites, the document image is displayed at the same coordinate position in this semitransparent-screen coordinate system.

Assume now a case where, at each site in this system, for example, the person there is situated at the center of the semitransparent screen, the document is displayed on the left side of the semitransparent screen, the real persons at both sites are pointing at the displayed document with their left hand. In this case, each real person can point at the document image at the same position on the semitransparent screen as the other person, as if looking at a mirror.

An example where communication is performed between a site 1 and a site 2 will be explained below in detail with reference to FIGS. 1A to 1G.

Figure 1A:
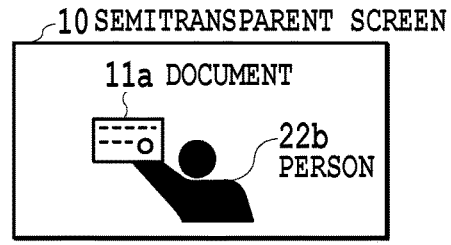
FIGS. 1A to 1G are views explaining a technique for superimposed display of a person video and a document image.
Figure 1B:
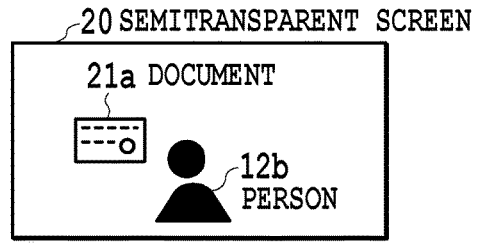

FIG. 1A shows a content displayed on a semitransparent screen 10 at the site 1. In FIG. 1A, there are displayed an on-screen person 22b as a real person 22a being the communicating target at the site 2 and a document image 11a of an electronic document used in the communication. FIG. 1B shows a content displayed on a semitransparent screen 20 at the site 2. In FIG. 1B, there are displayed an on-screen person 12b as a real person 12a being a communicating target at the site 1 and a document image 21a of the electronic document used in the communication. The document image 11a and the document image 21a are images of the same electronic document. As shown in FIGS. 1A and 1B, the document images displayed on the semitransparent screens at both sites are displayed at the same position in the screen coordinate system.

Figure 1C:
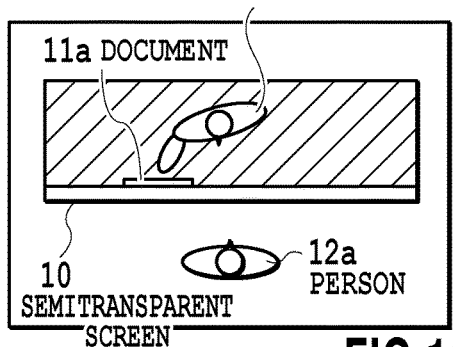
Figure 1D:
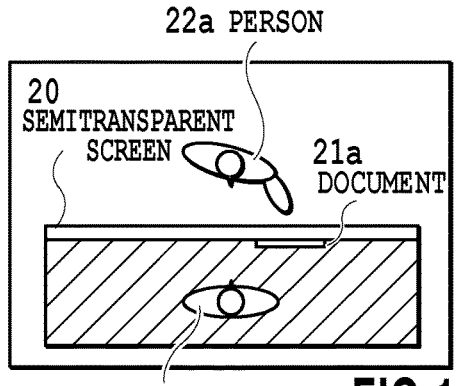

FIG. 1C is a view of the real person 12a and the semitransparent screen 10 at the site 1 as seen from above. Also, in FIG. 1C, the on-screen person 22b belonging to the site 2 and the document image 11a, which are displayed on the semitransparent screen 10, are shown arranged in a virtual space (hatched area) and seen from above. A mirror image of the real person 22a at the site 2 is displayed as the on-screen person 22b. Similarly, FIG. 1D is a view of the real person 22a and the semitransparent screen 20 at the site 2 as seen from above. Also, in FIG. 1D, the on-screen person 12b belonging to the site 1 and the document image 21a, which are displayed on the semitransparent screen 20, are shown arranged in a virtual space (hatched area) and seen from above.

Figure 1E:
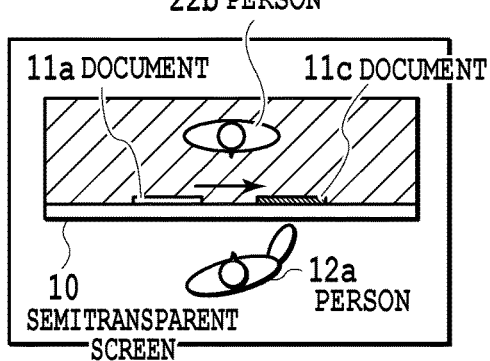

Assume that, as shown in FIG. 1E, the real person 12a at the site 1 changes the display position of the document image 11a from the left side to the right side of the semitransparent screen 10. Specifically, assume that the real person 12a changes the display position of the document image to such a coordinate position that its X value in the screen coordinate system is changed for example from 30 to 180. A document image 11c at the changed position is the same image as the document image 11a but its display position has been changed therefrom. Consider now a situation where the real person 22a at the site 2, on the other hand, does not change the display position of the document image 21a displayed at the site 2 (i.e. keeping the state in FIG. 1D).

Figure 1F:
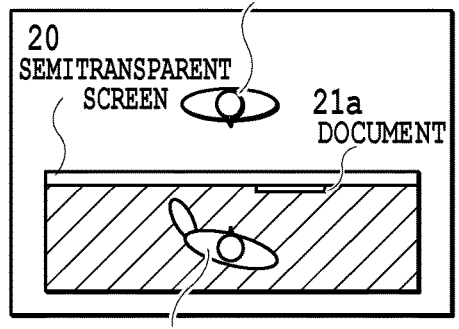

Assume further that, in this situation, the real person 12a at the site 1 points with the right hand at the document image 11c, which is situated on the right side of the semitransparent screen 10, as shown in FIG. 1E. In this case, displaying the on-screen person 12b and the document image 21a at the site 2 as shown in FIG. 1F results in unconformity between the contents displayed at the two sites. In FIG. 1F, the on-screen person 12b as the real person 12a at the site 1 is displayed on the semitransparent screen 20. The real person 12a at the site 1 is pointing with the right hand at the document image on the right side of the semitransparent screen 10. However, since the on-screen person 12b displayed on the semitransparent screen 20 is a mirror image, the on-screen person 12b is raising the left hand in his or her video. As shown in FIG. 1F, the X value of the document image 21a displayed on the semitransparent screen 20 at the site 2 is still 30 in the screen coordinate system, and the document image 21a is therefore still being displayed on the left side of the screen relative to the real person 22a. That is, the real person 22a at the site 2 sees the video of the on-screen person 12b pointing at the opposite direction from the document image.

Also, in a case where unconformity as that in FIG. 1F occurs and conversely the real person 22a at the site 2 points at the document 21a, the real person 12a at the site 1 sees the video of the real person 22a pointing at the opposite position.

Figure 1G:
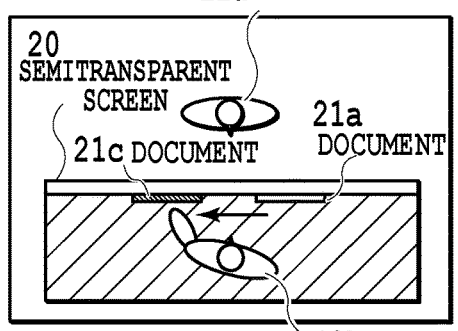

Then, to solve this unconformity, the conventional system has disclosed a process to avoid the display of the content like FIG. 1F and to display the content as shown in FIG. 1G. FIG. 1G shows an example of performing a process in which, in the case where the real person 12a in the site 1 changes the X-coordinate value of the document image from 30 to 180 as mentioned above, the display position of the document image displayed at the site 2 is synchronously changed. In other words, on the screen 20 at the site 2, too, the display position of the document image is changed (moved) from the left side to the right side of the screen relative to the real person 22a. Specifically, a document image 21c is displayed on the semitransparent screen 20 at the position with the same screen coordinates as the display position of the document image 11c at the site 1, i.e. at a position obtained by changing the X value from 30 to 180. The occurrence of the unconformity is prevented by changing the display position of the document image at the other site in synchronization with the change in the display position of the document image at the one site as described above.

However, in the case of this conventional technique, the fact that a video of a person and a document image can be superimposed and displayed without inconsistency in turn leads to a problem in that the document image cannot be displayed at a desired position at each site. That is, as shown in FIG. 1E, in the case where the real person 12a at the site 1 changes the display position of the document image, the display position of the document image at the site 2 is changed to a position which the real person 22a does not desire. In the following embodiments, explanation will be given of examples where superimposed display without inconsistency can be performed while the document image can also be displayed at a desired position at each site.

Embodiment 1

An embodiment of the present invention will be explained below with reference to drawings. Note that the constituent components described in this embodiment are mere examples and are not intended to limit the scope of the present invention thereto.

<Equipment Configuration of System>

Figure 2A:
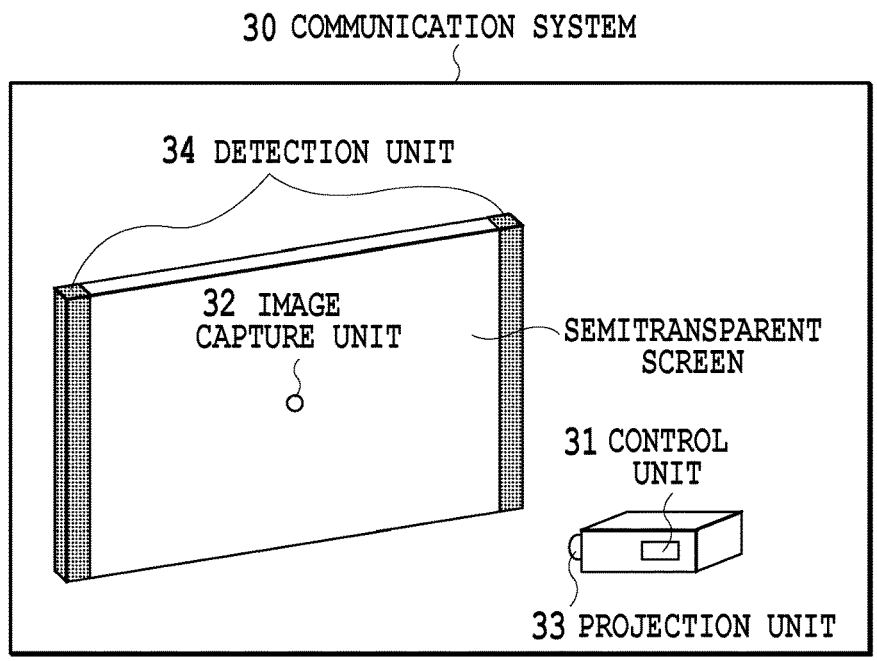
FIGS. 2A and 2B are views showing the configuration of a communication system according to an embodiment.
Figure 2B:
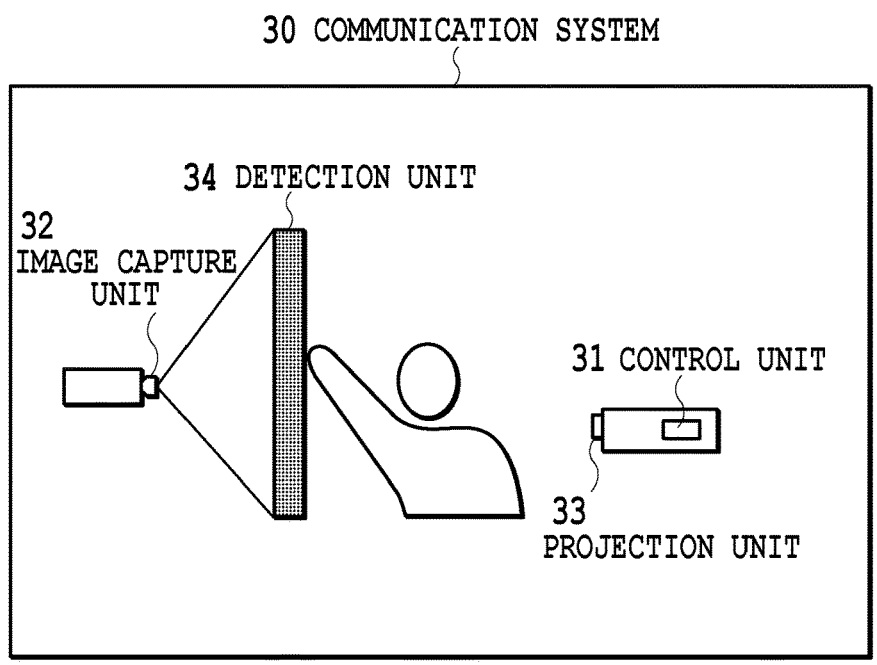
Figure 3:
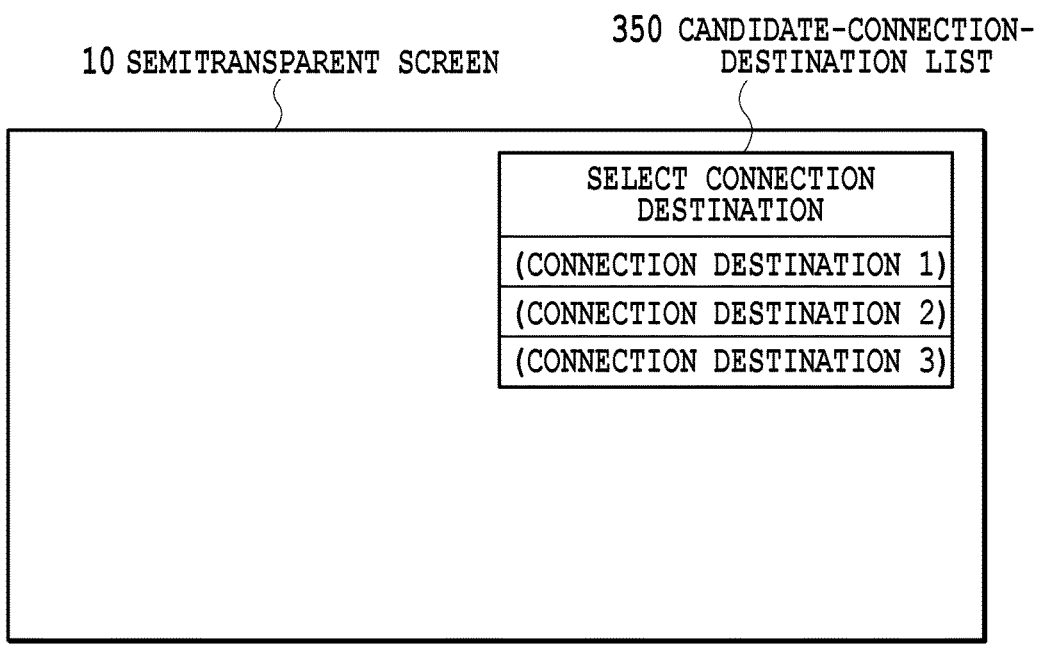
FIG. 3 shows an example of a window including a candidate-connection-destination list in Embodiment 1.

FIGS. 2A and 2B show the configuration of a communication system 30 in this embodiment. The communication system 30 shown in FIGS. 2A and 2B is provided at each of sites between which remote communication is to be performed. Note that being "remote" merely means to be simply separated, and any distance may be present therebetween. In an extreme case, the communication system may be installed in each of rooms situated right next to each other.

FIG. 2A is a view showing the overall configuration of the communication system while FIG. 2B is a side view showing how a user uses the communication system.

The communication system. 30 includes a control unit 31 configured to control the entire system, a semitransparent screen 10, and an image capture unit 32 configured to capture an image of a person standing in front of the semitransparent screen 10. The communication system 30 also includes a projection unit 33 configured to project a display content on the semitransparent screen 10, and a detection unit 34 configured to detect operation performed by the person.

The control unit 31 includes a CPU for executing a program and a RAM, a ROM, and a hard disk drive for storing the program. The control unit 31 also includes connection interfaces to the projection unit 33, the image capture unit 32, and the detection unit 34. The control unit 31 further includes a power switch, a network interface for connecting to the system at another site, and other relevant components.

The image capture unit 32 is arranged as a digital video camera or the like installed behind the semitransparent screen, as shown in FIGS. 2 and 3 of the Spanish Patent No 2399263. Using the technique described in the patent document, the image capture unit 32 of this embodiment does not capture a video projected on the semitransparent screen but only captures an image of information behind the semitransparent screen (in FIG. 2B, to the right of the semitransparent screen) (e.g. an operator standing in front of the semitransparent screen). In short, the image capture unit 32 captures an image of the operator situated to face the display surface of the semitransparent screen from the back surface side of the semitransparent screen.

The projection unit 33 is implemented by means for example of a projector and configured to receive projection images from the control unit 31 and project them on the semitransparent screen. The projection images include a person video (person streaming image) capturing the person present at the other site and a document image. Note that the following will explain an example where one projector projects the projection images including the person video and the document image superimposed on each other. However, a plurality of projectors may be prepared and respectively project the person video and the document image.

The detection unit 34 is implemented by means for example of a digitizer. The digitizer includes an infrared light transmitter and receiver. The detection unit 34 is configured to, when the operator touches the semitransparent screen with his or her finger, detect the touched position on the semitransparent screen based on the time taken for infrared light emitted from the transmitter to be reflected on the finger and reach the receiver. The touched position is expressed in a coordinate system on the screen as a position relative to the origin of this screen coordinate system. In this embodiment, as mentioned earlier, the upper left corner of the semitransparent screen is set as the origin and the X- and Y-coordinate values increase toward the right and the bottom, respectively, from the origin.

<Summary of Communication System>

The communication system shown in FIGS. 2A and 2B are installed at each of sites between which communication is to be performed. These communication systems are connected to each other through the network interfaces included in their control units 31 and a network communication channel.

In this embodiment, remote communication is performed between a site 1 and a site 2. In the following, the components of the communication system installed at the site 1 will be referred to as the control unit 31-1, the image capture unit 32-1, the projection unit 33-1, and the detection unit 34-1. Also, the components of the communication system installed at the site 2 will be referred to as the control unit 31-2, the image capture unit 32-2, the projection unit 33-2, and the detection unit 34-2.

Also, in this embodiment, the semitransparent screen 10 installed at the site 1 and a semitransparent screen 20 installed at the site 2 are the same in width and height.

<Processes from Power-on to Start of Communication>

Next, explanation will be given of a summary of processes involved until the start of operation for the remote communication to be explained in this embodiment. For example, upon receipt of a power-on instruction from the operator present at the site 1, the control unit 31-1 at the site 1 reads a program stored in the hard disk drive in advance and starts executing processes. This program may be a program capable of simultaneously executing a plurality of processes.

The control unit 31-1 reads candidate connection destinations for communicating targets which are stored in the hard disk drive in advance. Using information on the candidate connection destinations thus read, the control unit 31-1 creates a window including a candidate-connection-destination list in the form of table, which the user can touch to select a connection destination. The control unit 31-1 instructs the projection unit 33-1 to project the created candidate-connection-destination list. In response to the projection instruction, the projection unit 33-1 projects the window including the candidate-connection-destination list on the semitransparent screen 10.

FIG. 3 is a view showing the result of projection of a window including a candidate-connection-destination list 350 on the semitransparent screen 10. Seeing the candidate-connection-destination list 350 projected on the semitransparent screen 10, the operator designates the connection destination by selecting a connection destination from the candidate-connection-destination list 350 and touching the semitransparent screen 10 with his or her finger.

The detection unit 34-1 at the site 1 detects that the operator has touched the semitransparent screen 10, and transmits the corresponding coordinate information to the control unit 31-1. Based on the coordinate information received, the control unit 31-1 determines the connection destination designated by the operator from the candidate-connection-destination list 350. The control unit 31-1 refers to the information on the connection destination thus determined and requests a connection to the control unit 31-2 at the site 2 through their network interfaces.

In a case where the control unit 31-2 is in a connection waiting state, the control unit 31-2 receives the connection request and responds the control unit 31-1 to notify that a connection has been established. In a case where the control unit 31-1 cannot detect the response indicating the establishment of a connection, the control unit 31-1 re-requests a connection to the control unit 31-2 after waiting a predetermined time. The control unit 31-1 returns to the process of projecting the window including the candidate-connection-destination list 350 in a case where the control unit 31-1 re-requests a connection a predetermined number of times but still cannot detect the response from the control unit 32-2. Once communication from the control unit 31-1 to the control unit 31-2 is established by the above processes, data can now be transmitted accordingly.

Meanwhile, in parallel with the above processes, the control unit 31-1 simultaneously executes a process of waiting a connection from the control unit 31-2. Thus, at the site 2, too, in a case where the operator there powers on the terminal and selects the connection destination, the connection process is performed from the control unit 31-2 to the control unit 31-1. In doing so, in a case where the control unit 31-1 is in a connection waiting state, communication is established, and data can be transmitted from the control unit 31-2 to the control unit 31-1. As a result, communication can now be performed between the site 1 and the site 2.

<Person-Video Projecting Process>

Figure 4A:
FIGS. 4A to 4D are views explaining a process of projecting a person video in Embodiment 1.
Figure 4B:
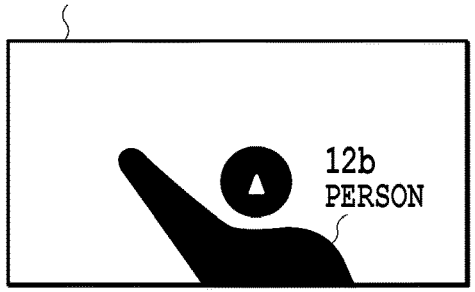

FIGS. 4A to 4D are views for explaining a person video capturing a person. FIG. 4A is a view of the semitransparent screen 10 at the site 1 and a real person 12a standing in front thereof as seen from behind the real person 12a. As shown in FIG. 2B, the image capture unit 32-1 at the site 1 obtains a person video by capturing an image of the real person 12a, who is the operator, standing in front of the semitransparent screen 10 from the opposite side of the semitransparent screen 10 from the person 12a. The image capturing range has the same size as the semitransparent screen. Since the image capture unit 32-1 is placed behind (far side of) the semitransparent screen relative to the real person 12a, the video captured is a video of the real person 12a seen from the front, as shown in FIG. 4B. The image capture unit 32-1 creates data of that person video and transmits it to the control unit 31-1. The control unit 31-1 transmits the person video data thus received to the control unit 31-2 at the site 2.

Figure 4C:
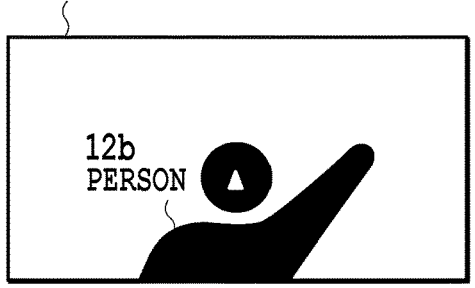
Figure 4D:
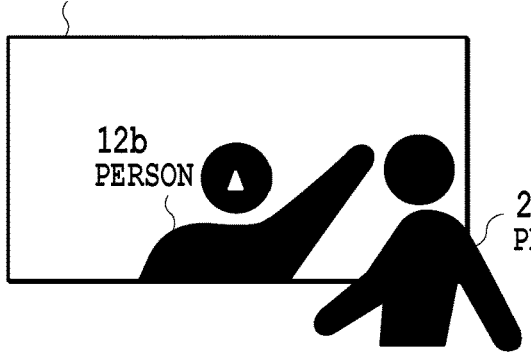

The control unit 31-2 at the site 2 receives the person video data transmitted from the site 1. As mentioned earlier, this person video needs to be a mirror image on the screen 20 on which it is to be displayed. In this embodiment, as shown in FIG. 2B, the image capture unit and the projection unit are arranged on the opposite sides of the screen from each other. Thus, the control unit 31-2 creates therein a mirror image of the received person video so that it can be displayed as shown in FIG. 4C, and instructs the projection unit 33-2 project the resultant person video. In response to the projection instruction, the projection unit 33-2 projects the person video on the semitransparent screen 20. FIG. 4D shows a state where an on-screen person 12b who is the mirror image is displayed on the semitransparent screen 20 at the site 2 and a real person 22a at the site 2 is looking at the on-screen person 12b.

Note that instead of being created by the control unit 31-2, the mirror image may be created in advance by the control unit 31-1 and then transmitted to the control unit 31-2. Here, the mirror-image creation process is not necessary in a case where, unlike FIG. 2B, the image capture unit and the projection unit are both placed behind (far side of) the screen. Also, the mirror image may be created as necessary in a case for example where one site has a configuration as shown in FIG. 2B whereas the other site has a configuration as shown for example in FIGS. 2 and 3 of the conventional patent document.

By performing the above processes at each site, a mirror image of the person video captured at the site 1 is projected on the semitransparent screen 20 at the site 2 while a mirror image of the person video captured at the site 2 is projected on the semitransparent screen 10 at the site 1.

Note that, in this embodiment, the video captured at the other site has been described using the expression "person video" for the sake of explanation. Any video may suffice as long as it is captured by the image capture unit at the other site. Thus, the background may be included in addition to the person. Alternatively, the captured does not necessarily have to be a person.

Also, the explanation has been given above through an example focusing solely on video data in conjunction with the embodiment. However, audio data is also transmitted to the other site similarly to the video data. The audio data is outputted through a speaker incorporated in the control unit, an externally connected speaker, or the like.

<Document-Image Projecting Process>

Figure 5A:
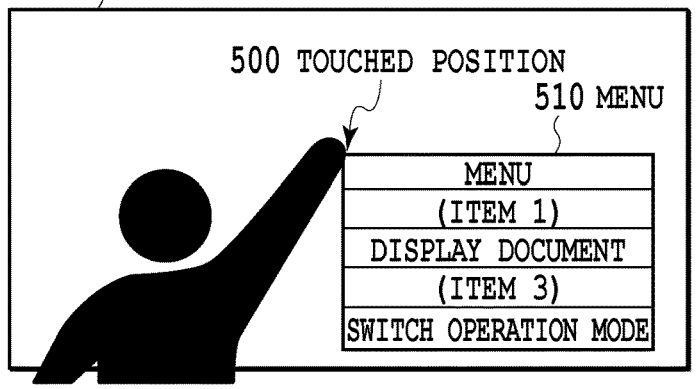
FIGS. 5A to 5C show an example of windows displayed during a document displaying process in Embodiment 1.
Figure 5B:
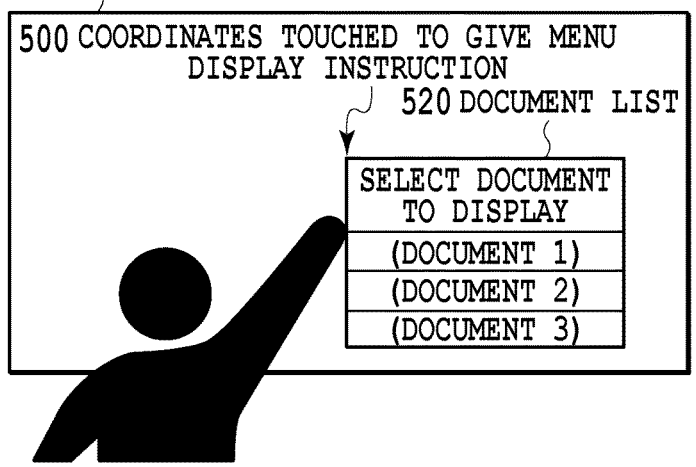
Figure 5C:
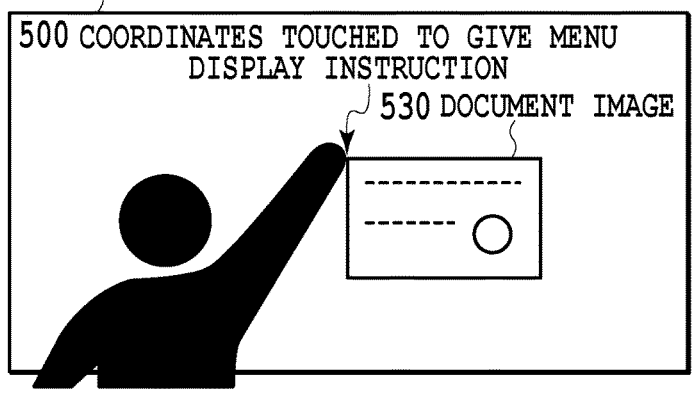

Next, a document-image projecting process will be explained with reference to FIGS. 5A to 5C. Upon receipt of a menu display instruction for example from the real person 12a, who is the operator at the site 1, the detection unit 34-1 notifies the control unit 31-1 of the menu display instruction and information on the coordinates at which the instruction has been given.

In response to the menu display instruction thus notified of, the control unit 31-1 creates a menu window therein and instructs the projection unit 33-1 to project the created window at the coordinates at which the instruction has been given. In response to the projection instruction, the projection unit 33-1 projects the menu window on the semitransparent screen. FIG. 5A shows an exemplary result of the projection. As shown in FIG. 5A, the menu window is projected with the coordinates of the upper left corner being the position touched by the operator.

Seeing a menu 510 projected on the semitransparent screen 10, the real person 12a, who is the operator, designates an item for displaying a document from the menu 510 by touching the semitransparent screen with his or her finger.

The detection unit 34-1 detects that the operator has touched the semitransparent screen 10, and transmits the corresponding coordinate information to the control unit 31-1. The control unit 31-1 compares the coordinate information received and the information on the menu window created in the control unit 31-1 and detects that the operator has designated the item for displaying a document from the menu window. The control unit 31-1 creates therein a window including a document list for listing and displaying documents stored in advance. The control unit 31-1 then instructs the projection unit 33-1 to project the created window at the coordinates at which the menu display instruction has been given (the first touched coordinates). In response to the projection instruction, the projection unit 33-1 projects a window including a document list 520 on the semitransparent screen 10, as shown in FIG. 5B.

Seeing the document list 520 projected on the semitransparent screen 10, the operator designates a document to be displayed from the document list 520 by touching the semitransparent screen 10 with his or her finger. The detection unit 34-1 detects that the operator has touched the semitransparent screen 10, and transmits the corresponding coordinate information to the control unit 31-1. The control unit 31-1 compares the coordinate information received and the information on the window including the document list created in the control unit 31-1 and identifies the document designated by the operator from the document list. The control unit 31-1 reads the identified document from the hard disk drive, creates a document image therein, and instructs the projection unit 33-1 to project the created image at the coordinates at which the menu display instruction has been given. In response to the projection instruction, the projection unit 33-1 projects the document image on the semitransparent screen, as shown in FIG. 5C.

To display the document image on the semitransparent screen 20 in the site 2, the control unit 31-1 transmits the same document image and coordinate information also to the control unit 31-2 and issues a projection request thereto. The control unit 31-2 receives the document image and the coordinate information transmitted from the site 1. The control unit 31-2 projects the received document image at the same coordinates as the received coordinate information.

The control unit 31-2 instructs the projection unit 33-2 to project the received document image at the coordinates indicated by the received coordinate information. In response to the projection instruction, the projection unit 33-2 projects the document image on the semitransparent screen 20.

By the above operations and processes, the document image, for which a display start instruction is given at the site 1, is displayed on the screen at the site 1 and on the screen at the site 2. By performing similar operations and processes at the site 2, a document image for which a display start instruction is given at the site 2 can be displayed at the site 1 and at the site 2.

Note that, in this embodiment, the object to be superimposed and displayed on the person video is described as "document image" for the sake of explanation. Like the person video, the object to be superimposed and displayed thereon may be a document video, i.e. a moving image instead of a still image. In other words, any mode may be employed as long as a mirror image of the person video captured at the other site is displayed and an image or a video which is not a mirror image is superimposed and displayed on the person video.

<Document-Image Moving Process>

Figure 6A:
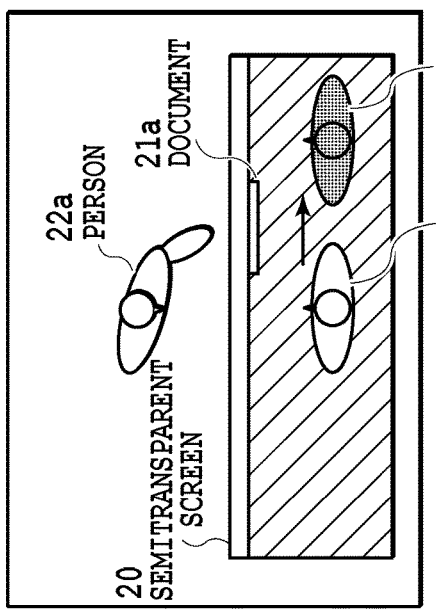
FIGS. 6A to 6D are views showing states before and after movement of a document image in Embodiment 1.

Next, a document-image moving process will be explained with reference to drawings. FIGS. 6A to 6D are views showing states before and after the document-image moving process. FIG. 6A is a view of the real person 12a and the semitransparent screen 10 at the site 1 before and after the moving process as seen from above. Also, in FIG. 6A, the on-screen person 22b as the communicating target displayed on the semitransparent screen 10 and the document image 11a are shown arranged in a virtual space (hatched area) and seen from above. The on-screen person 22b and the document image 11a in FIG. 6A represent the on-screen person and the document image displayed at their respective positions before the moving process, respectively. In other words, the state in FIG. 6A before the moving process is the same as the state shown in FIG. 1C.

Figure 6B:
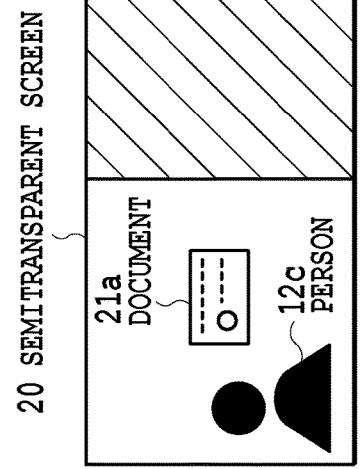
Figure 6C:
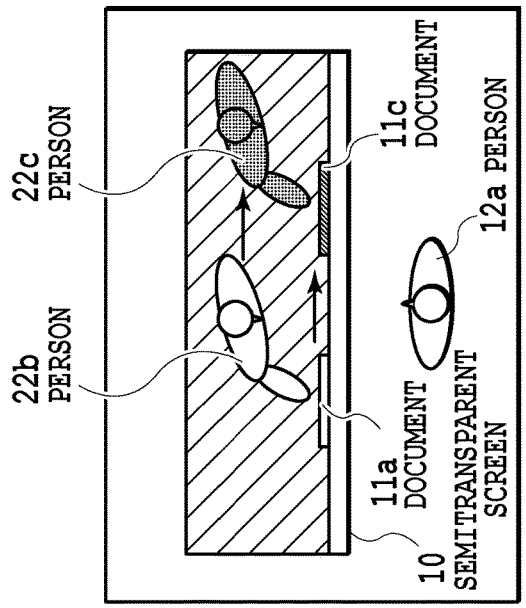

FIG. 6C is a view of the real person 22a and the semitransparent screen 20 at the site 2 before and after the moving process as seen from above. Also, in FIG. 6C, the on-screen person 12b as the communicating target displayed on the semitransparent screen 20 and the document image 21a are shown arranged in a virtual space (hatched area) and seen from above. The on-screen person 12b and the document image 21a in FIG. 6C represent the on-screen person and the document image displayed at their respective positions before the moving process, respectively. In other words, the state in FIG. 6C before the moving process is the same as the state shown in FIG. 1D.

Detecting that the real person 12a at the site 1 has touched the semitransparent screen 10, the detection unit 34-1 transmits the corresponding coordinate information to the control unit 31-1. The control unit 31-1 compares the coordinate information received and the coordinate information on the displayed document image 11a on the screen and determines whether or not the touched position is within the display range of the document image. If determining that the touched position is outside the display range of the document image 11a, the control unit 31-1 ends the process without performing processes to be explained below with reference to FIGS. 7A and 7B.

If determining that the touched position is within the display range of the document image 11a, the control unit 31-1 determines that a document-image moving process has started, and starts executing the following iterative processing shown in FIG. 7A. Note that a document-image moving process may be determined to have started upon detection by the detection unit 34-1 that the real person 12a has kept touching coordinates corresponding to the position of the document image 11a for a predetermined long time.

FIGS. 7A and 7B are charts each showing a process of moving the displayed document image. FIG. 7A is a flowchart of a process executed by the control unit 31-1 at the site 1, while FIG. 7B is a flowchart of a process executed by the control unit 31-2 at the site 2.

If determining that a document-image moving process has started, the control unit 31-1 performs the process in Step S701 shown in FIG. 7A. In Step S701, the control unit 31-1 calculates the difference in coordinate by which the operator has moved by the document image. Detecting that the coordinate information is updated while detecting the semitransparent screen 10 is touched, the detection unit 34-1 transmits the updated coordinate information to the control unit 31-1. Based on the coordinate information before and after the update, the control unit 31-1 calculates the X-coordinate and Y-coordinate differences. Note that the detection unit 34-1 can detect the moved coordinate information as follows. Specifically, for example as the operator keeps touching coordinates within the document image for a predetermined time, the document is selected. A position on the screen touched thereafter by the operator as the destination of the movement can then be detected as the coordinate information on the destination of the movement.

Then in Step S702, the control unit 31-1 moves the displayed document image. The control unit 31-1 updates the display position of the document image 11a displayed on the screen 10 based on the X-coordinate and Y-coordinate differences calculated in Step S701. The control unit 31-1 then instructs the projection unit 33-1 to project the document image at the updated coordinates. In response to the projection instruction, the projection unit 33-1 projects the document image on the semitransparent screen 10 at the display position with the updated coordinates. Note that the control unit 31-1 may create the document image whose display position is updated, and the projection unit 33-1 may simply be instructed to project that image.

FIG. 6A illustrates the effect of the process in Step S702. Specifically, in FIG. 6A, a document 11c is shown displayed on the semitransparent screen 10 after the movement in place of the document 11a. Note that the document 11a and the document 11c are the same document image but displayed at different positions.

Then in Step S703, the control unit 31-1 moves the on-screen person 22b displayed on the semitransparent screen 10. The control unit 31-1 updates the display coordinates of the on-screen person 22b based on the X-coordinate and Y-coordinate differences calculated in Step S701. The control unit 31-1 then instructs the projection unit 33-1 to project the on-screen person at the updated coordinates. In response to the projection instruction, the projection unit 33-1 projects the on-screen person on the semitransparent screen 10 at the display position with the updated coordinates. Specifically, the projection unit 33-1 changes the position at which to project the person video including the on-screen person 22*b*, based on the updated display coordinates.

FIG. 6A shows the effect of the process in Step S703. Specifically, in FIG. 6A, an on-screen person 22*c* is shown displayed on the semitransparent screen 10 after the movement in place of the on-screen person 22*b*. Note that the on-screen person 22*b* and the on-screen person 22*c* are the same person but displayed at different positions.

As described above, in the process of this embodiment, in a case where the display position of the document image is moved at a site, the on-screen person on the screen at that site is also moved along with the movement of the display position of the document image in the same direction and by the same amount of movement as the document image. Note that the explanation has been given such that the on-screen person is moved for the sake of explanation. It is the person video including the on-screen person that is actually moved on the screen.

These processes of moving the document image and the person video change the content displayed on the semitransparent screen 10 at the site 1 as shown in FIG. 6B. The hatched area in FIG. 6B is an area newly formed on the left side of the semitransparent screen 10 as a result of moving the person video to the right side along with the movement of the document image to the right side. A video can be displayed in this area but there is no video to display in the area since it is outside the image capturing range of the image capture unit 32-2.

In Step S704, the control unit 31-1 transmits the X-coordinate and Y-coordinate differences calculated in Step S701 to the control unit 31-2 at the site 2, which the site 1 is performing remote communication with.

The processing has been explained above such that the person-video moving process is performed after the document-image moving process. Note, however, that these processes have merely been explained separately for the sake of explanation. That is, the processes in Steps S702 and S703 may be performed simultaneously. Also, the coordinate-difference transmitting process shown in Step S704 may also be performed simultaneously with Steps S702 and S703.

In Step S751, the control unit 31-2 at the site 2 receives the X-coordinate and Y-coordinate differences from the control unit 31-1 at the site 1.

In Step S752, the control unit 31-2 uses the received X-coordinate and Y-coordinate differences to update the display coordinates of the on-screen person 12*b* and move the on-screen person 12*b* accordingly. The control unit 31-2 updates the display coordinates of the on-screen person 12*b* based on the received X-coordinate and Y-coordinate differences but in the opposite direction. Specifically, the control unit 31-2 adds the values of the X-coordinate and Y-coordinate differences with their signs inverted. The control unit 31-2 then instructs the projection unit 33-2 to project the on-screen person at the updated coordinates. In response to the projection instruction, the projection unit 33-2 projects the person video on the semitransparent screen at the updated display position. FIG. 6C illustrates the effect of this process. Specifically, in FIG. 6C, the document 21*a* has not been moved on the semitransparent screen 20 with the movement of the on-screen person, and an on-screen person 12*c* is displayed in place of the on-screen person 12*b*. Note that the on-screen person 12*b* and the on-screen person 12*c* are the same on-screen person but displayed at different positions.

Figure 6D:
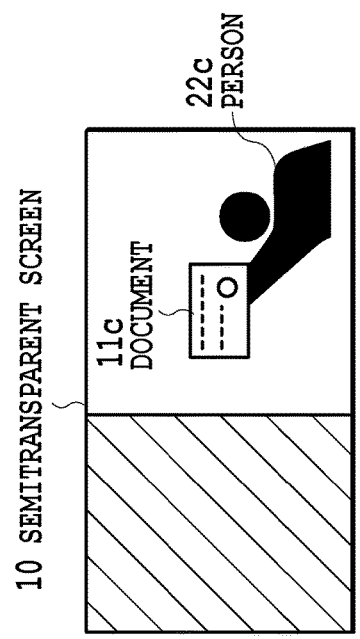

This person-video moving process changes the content displayed on the semitransparent screen 20 at the site 2 as shown in FIG. 6D. The hatched area in FIG. 6D is an area newly formed on the right side as a result of moving the person video to the left side as opposed to the right side to which the document has been moved at the site 1. A video can be displayed in this area but there is no video to display in the area since it is outside the image capturing range of the image capture unit 32-1.

The effect of this process will be explained supplementarily. First, before the moving process, the real person 12*a* at the site 1 is looking at the document image displayed on the left hand side of the screen. The real person 22*a* at the site 2 is likewise looking at the document image displayed on the left hand side of the screen. That is, in a case where both real persons are pointing with their left hand at the document images displayed on the left hand side of the screens at the respective sites, the on-screen persons are displayed on the screens at the respective sites, pointing at the document images at the same position as if they are reflected on a mirror.

Figure 8A:
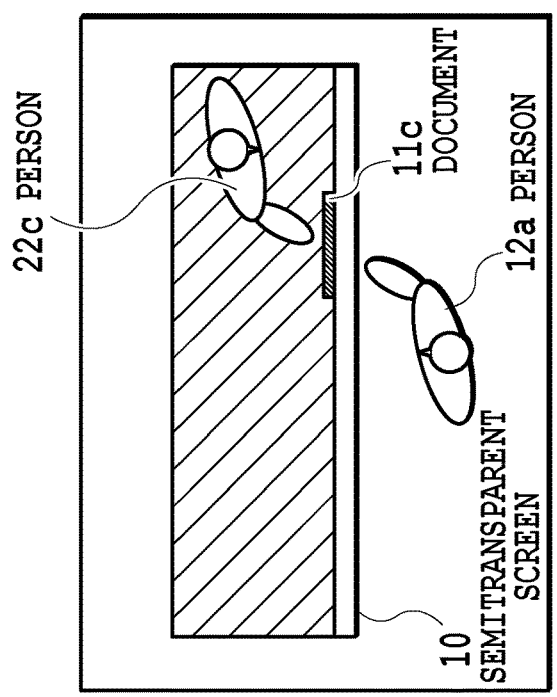
FIGS. 8A and 8B are views showing that superimposed display after the movement of the document image is free of inconsistency in Embodiment 1.
Figure 8B:
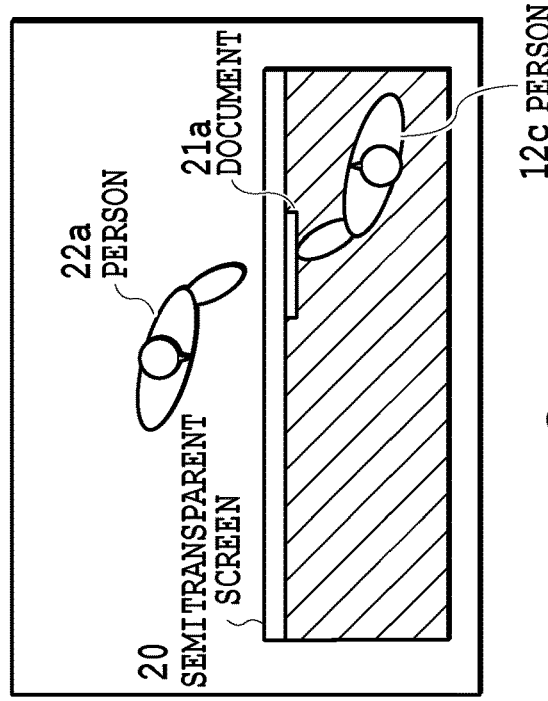

Here, assume that the real person 12*a* at the site 1 moves the document image to the right hand side of the screen and the person video is accordingly moved as shown in FIGS. 6A and 6B. Assume further that, in this situation, the real person 12*a* at the site 1 now points with the right hand at the document image displayed on the right side of the screen. FIGS. 8A and 8B are views of the state of the sites including the virtual spaces therein in the above situation as seen from above. Notice that the display position of the document image is different between the semitransparent screen 10 and the semitransparent screen 20. This is because the document image 11*a* is changed to the document image 11*c* at the site 1 whereas the document image 21*a* is still being displayed at the site 2. Nonetheless, the figures show that no inconsistency has occurred in the superimposed display of the person video and the document image. Specifically, the real person at each site keeps pointing at the same position on the semitransparent screen, and the real person 22*a* at the site 2 can keep the document image at the originally displayed position, i.e. on the left hand side of the screen.

As described above, upon movement of the document image, both the document image and the person video are moved at one site whereas the person video is moved in the opposite direction at the other site. In this way, it is possible to perform superimposed display without inconsistency while also changing the display position of the document image to any position.

Upon detection that the operator has stopped touching the semitransparent screen, the detection unit 34-1 notifies the control unit 31-1 that the hand is released. In response to the notification, the control unit 31-1 determines that the document-image moving process is finished, and notifies the control unit 31-2 of that information. The control unit 31-1 then ends the above iterative processing.

As described above, in response to an instruction to move the document image at the site 1, the document image and the person video at the site 1 are displayed such that they are moved by the same distance and in the same direction as instructed whereas the document image and the person video in the site 2 are displayed such that only the person video is moved by the same distance as instructed but in the opposite direction. As a result, it is possible to perform superimposed display without inconsistency while also displaying the electronic document at a desired position at each site.

Note that the above example has explained the case where the amount of movement of the person video and/or the document image at each site is determined based on the X-coordinate and Y-coordinate differences indicating how much the document image is moved. However, the amount of movement may be determined based only on the X-coordinate difference, for example. For instance, the video might appear awkward in a case where the document is moved upward or downward and the on-screen person is likewise moved upward or downward. On the other hand, the superimposed display might possibly have inconsistency in a case where the document is moved upward or downward but the on-screen person remains unmoved. To solve this, a process may be performed in which, for example, a predetermined threshold is set and the amount of movement is determined using only the X-coordinate difference while ignoring the Y-coordinate difference in a case where the Y-coordinate difference is less than the threshold.

Embodiment 2

In Embodiment 1, the example has been explained in which superimposed display without inconsistency can be performed while the document image can also be displayed at any position by the operator at each site. Here, depending on the user, the display position of the document image at his or her own site may or should be changed in response to a change in the display position of the document image at the other site. With this taken into consideration, in Embodiment 2, an example will be explained in which a menu for selecting what operation to perform in response to a document-image moving instruction is provided to enable the switching of the operation mode at the time of moving the document image.

The configuration of the communication system at each site, the processes from the power-on to the start of communication, the person-video projecting process, and the document-image projecting process are similar to those in Embodiment 1, and explanation thereof will therefore be omitted.

<Document-Image Moving-Mode Switching Process>

In this embodiment, two modes, namely, "individually moving mode" and "synchronously moving mode," are provided as modes for moving the document image. The "individually moving mode" is a mode in which the display position of the document image at each site is not moved in synchronization with each other in response to a moving instruction from an operator and can be moved individually to any position, as explained in Embodiment 1. The "synchronously moving mode" is a mode in which the display position of the document image at each site is moved in synchronization with each other in response to a moving instruction from an operator. In short, the "synchronously moving mode" is a mode in which the display position in the screen coordinate system at each site is moved in synchronization with each other and, for example, operation as shown in FIG. 1G is performed.

In this embodiment, upon receipt of a menu display instruction from its operator, the detection unit 34-1 notifies the control unit 31-1 of the menu display instruction and information on the coordinates at which the instruction has been given. In response to the menu display instruction, the control unit 31-1 creates a menu window therein and instructs the projection unit 33-1 to project the created window at the coordinates at which the instruction has been given. In response to the projection instruction, the projection unit 33-1 projects the menu window on the semitransparent screen.

Seeing the menu window projected on the semitransparent screen, the operator designates the action by selecting the switching of the document-image moving mode from the menu window and touching the semitransparent screen with his or her finger. For example, the operator designates the action by touching with the finger the area displayed as "SWITCH MOVING MODE" in the menu window shown in FIG. 5A. The detection unit 34-1 detects that the operator has touched the semitransparent screen, and transmits the corresponding coordinate information to the control unit 31-1. Based on the coordinate information received, the control unit 31-1 detects that the operator has designated the switching of the document-image moving mode from the menu window. The control unit 31-1 creates therein a window for the operator to select between the "individually moving mode" and the "synchronously moving mode" mentioned above, and instructs the projection unit 33-1 to project the created window at the coordinates touched to give the menu display instruction.

Seeing the menu window projected on the semitransparent screen, the operator then designates either the "individually moving mode" or the "synchronously moving mode" by touching the semitransparent screen. The detection unit 34-1 detects that the operator has touched the semitransparent screen, and transmits the corresponding coordinate information to the control unit 31-1. Based on the coordinate information received, the control unit 31-1 detects the document-image moving mode designated by the operator from the menu window. The control unit 31-1 holds the detected document-image moving mode. The document-image moving mode functions to toggle its value between a value indicating the individually moving mode and a value indicating the synchronously moving mode each time either value is designated in the menu.

The example has been explained above in which the menu window is displayed by the same operation (touch operation) for displaying a document and for switching the operation mode. However, the present invention is not limited to this example. A menu for displaying a document and a menu for switching the operation mode may be displayed by different operations.

<Document-Image Moving Process>

Figure 9:
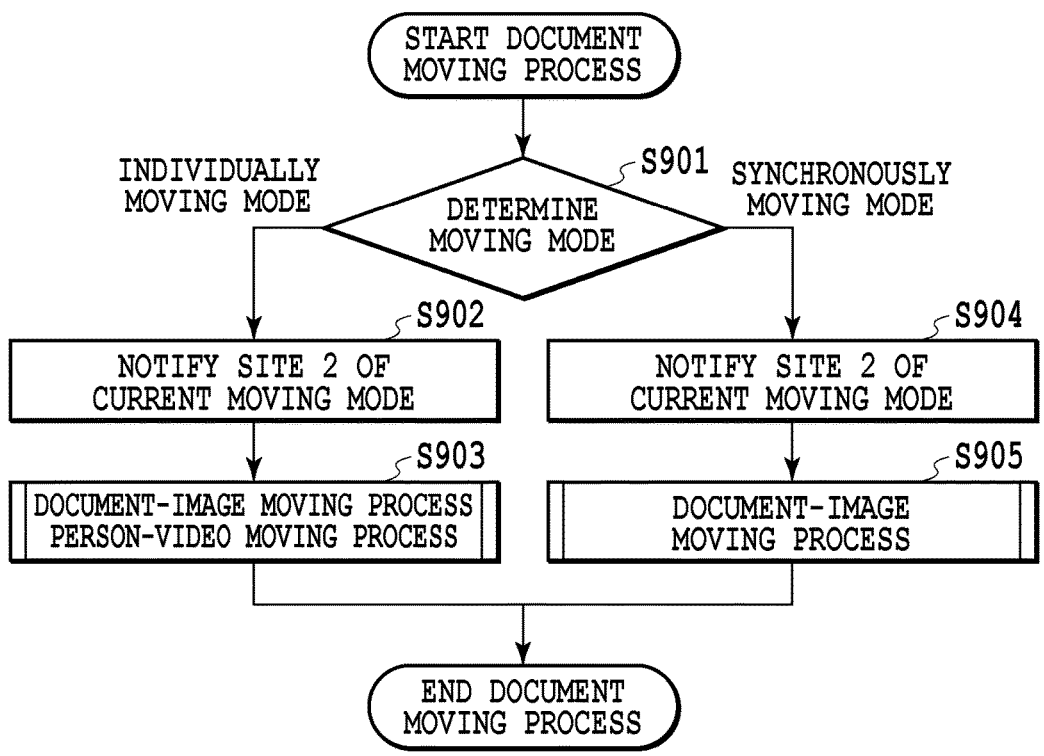
FIG. 9 is a flowchart explaining a process of switching a document-image moving mode in Embodiment 2.

The document-image moving process will be explained with reference to drawings. FIG. 9 shows a process to be executed by the control unit 31-1 at the site 1. As explained in Embodiment 1, the control unit 31-1 at the site 1 determines whether or not a document-image moving process has started, based on the coordinate information on the position touched by the operator, which is detected by the detection unit 34-1, and the coordinate information on the displayed document image. If determining a moving process has started, the control unit 31-1 proceeds to the process in FIG. 9.

In Step S901, the control unit 31-1 determines the document-image moving mode. The control unit 31-1 determines the current moving mode by referring to the value of the moving mode set by the operator through the menu window. The control unit 31-1 proceeds to step S902 if determining that the document-image moving mode is the "individually moving mode." In a case where the moving mode is different from one site to another, inconsistency occurs in the superimposed display. Thus, in Step S902, the control unit 31-1 notifies the control unit 31-2 at the site 2 of information indicating that the current document-image moving mode is the "individually moving mode." In Step S903, processes similar to those explained in Embodiment 1 are performed. Specifically, a document-image moving process and a person-video moving process are performed based on whether the site is the one at which the document image is actively moved or the one at which the document image is passively moved.

On the other hand, the control unit 31-1 proceeds to Step S904 if determining that the document-image moving mode is the "synchronously moving mode." In Step S904, the control unit 31-1 notifies the control unit 31-2 at the site 2 that the current document-image moving mode is the "synchronously moving mode." In Step S905, the control unit 31-1 performs a document-image moving process. Details of the process in Step S905 will be explained with reference to FIGS. 10A and 10B.

Figure 10A:
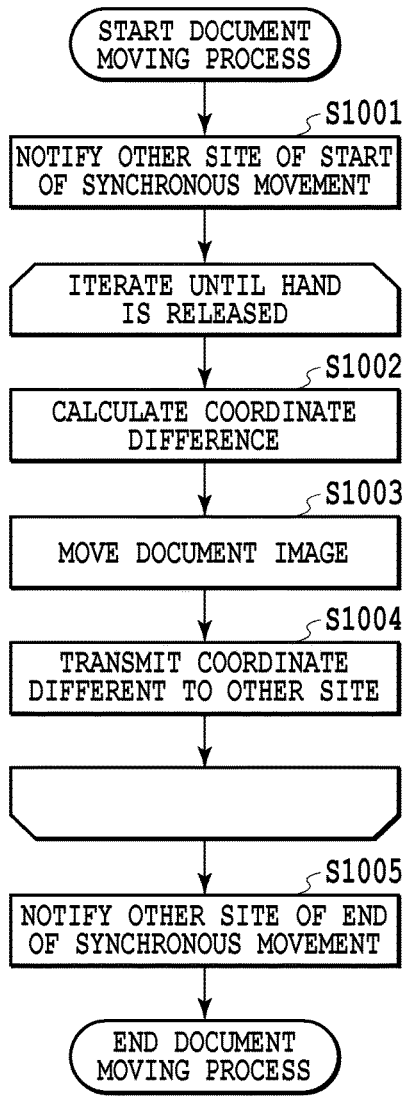
FIGS. 10A and 10B are flowcharts each explaining a process of moving the display of a document image during a synchronously moving mode in Embodiment 2.
Figure 10B:
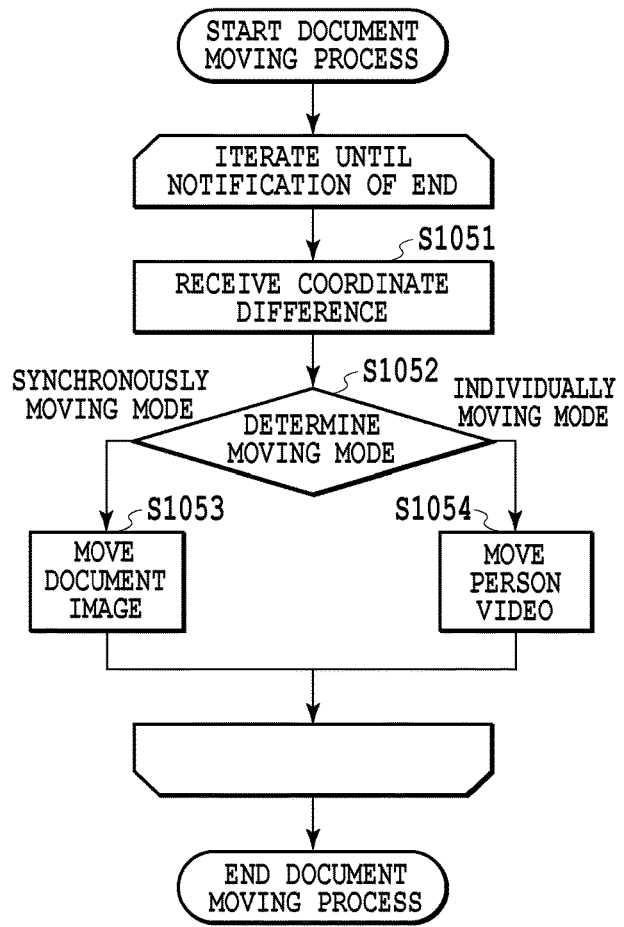

FIGS. 10A and 10B are charts showing the flows of processes performed during the synchronously moving mode in Embodiment 2. FIG. 10A is a flowchart of a process to be executed by the control unit 31-1 at the site 1. FIG. 10B is a flowchart of a process to be executed by the control unit 31-2 at the site 2.

In Step S1001, the control unit 31-1 notifies the control unit 31-2 of the start of synchronous movement of the document image. In response to the notification of the start of synchronous movement of the document image, the control unit 31-2 starts a document-image moving process.

In the following, the processes in Steps S1002, S1003, and S1004 are the same as the processes in Steps S701, S702, and S704 explained in Embodiment 1, respectively, and explanation thereof will therefore be omitted. Note that the person-video moving process explained in Step S703 in Embodiment 1 is not included in FIG. 10A.

At the site 2, in Step S1051, the control unit 31-2 receives the X-coordinate and Y-coordinate differences from the control unit 31-1 at the site 1.

In Step S1052, the control unit 31-2 determines the document-image moving mode. In doing so, the control unit 31-2 determines the document-image moving mode based on the moving mode notified of by the control unit 31-1 at the site 1 in Step S902 or S904 in FIG. 9. In FIG. 10B, the control unit 31-2 forwards the process to Step S1053 since this example focuses on the synchronously moving mode. Note that the control unit 31-2 forwards the process to Step S1054 if determining that the document-image moving mode is the individually moving mode. The process in Step S1054 is similar to the process in Step S752 explained in Embodiment 1.

In Step S1053, the control unit 31-2 updates the display coordinates of the document image based on the received X-coordinate and Y-coordinate differences. Specifically, the values of the X-coordinate and Y-coordinate differences should simply be added to the current display coordinates of the document image. That is, the display position of the document image at the site 2 is updated to the same display coordinates as those of the document image on the semitransparent screen 10 at the site 1. The example has been explained above in which the X-coordinate and Y-coordinate differences are used. Note, however, that the coordinate information on the actual X coordinate and the Y coordinate after the movement may be used instead. The control unit 31-2 then instructs the projection unit 33-2 to project the document image at the updated coordinates. In response to the projection instruction, the projection unit 33-2 projects the document image on the semitransparent screen.

The above movement of the document image in Steps S1003 and S1053 is performed as shown in FIGS. 1E and 1G as mentioned above.

Then in Step S1005, the detection unit 34-1 detects that the operator has stopped touching the semitransparent screen, and notifies the control unit 31-1 that the hand is released. In response to the notification, the control unit 31-1 determines that the document-image moving process is finished, and notifies the control unit 31-2 of that information. In response to the notification, the control unit 31-2 discards the designation of the moving-target document image. The control unit 31-1 ends the iterative processing.

In the above manner, the user can optionally switch the document-image moving mode. Thus, it is possible to realize a moving mode suitable to usage.

Embodiment 3

In Embodiments 1 and 2, the examples have been explained in which a document-image moving instruction involves changing the display position (display coordinates) of the document image while maintaining its display size unchanged. However, a document-image moving instruction may also possibly involve a process of changing the display size of the document image, i.e. a process of enlarging or reducing the document image. In this embodiment, a process performed in response to a document-image enlargement/reduction instruction will be discussed.

The equipment configuration of the terminal, the configuration of the system, the processes from the power-on to the start of communication, the person-video projecting process, and the document-image projecting process are similar to those in Embodiment 1 or 2, and explanation thereof will therefore be omitted.

<Enlarged/Reduced Display>

Upon detection that the operator has touched the semitransparent screen at two points, the detection unit 34-1 transmits the corresponding coordinate information to the control unit 31-1. The control unit 31-1 compares the coordinate information received and the coordinate information on the displayed document image and determines whether or not both of the points are within the display range of the document image. The control unit 31-1 ends the process without performing the following process if determining that only one or none of the two points is within the display range of the document image. A document-image enlarging/reducing process may be determined to have started upon detection by the detection unit 34-1 that the operator has kept touching coordinates of two points corresponding to the display position of the document image for a predetermined long time.

Figure 11A:
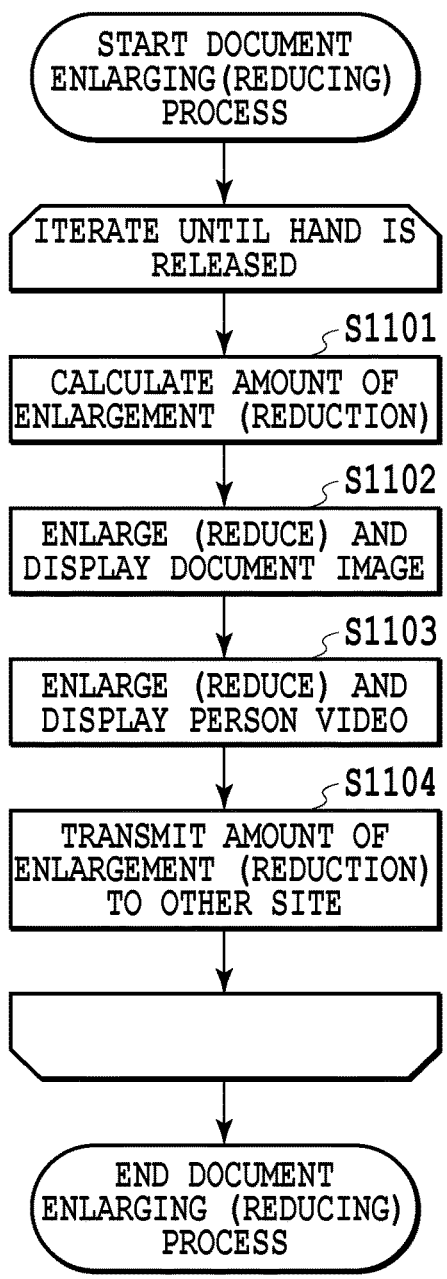
FIGS. 11A and 11B are flowcharts each explaining a process of enlarging or reducing the display of a document image in Embodiment 3.
Figure 11B:
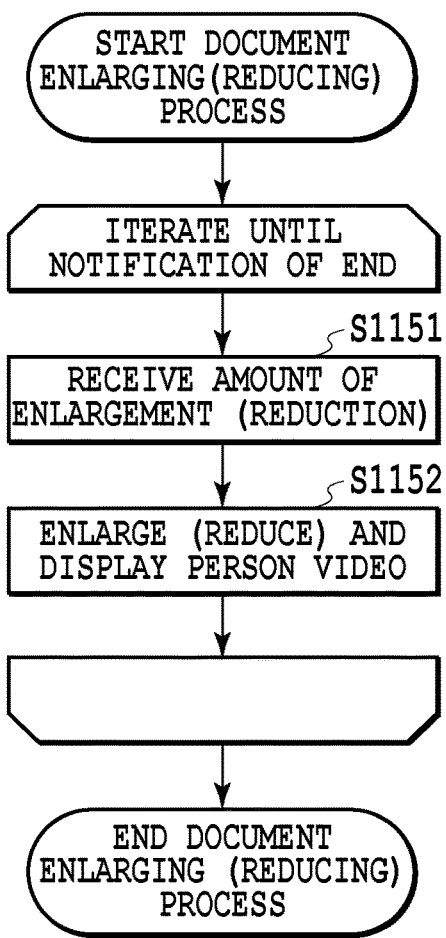

FIGS. 11A and 11B are charts each showing the flow of a document enlarging (or reducing) process in Embodiment 3. FIG. 11A is a flowchart of a process to be executed by the control unit 31-1 at the site 1. FIG. 11B is a flowchart of a process to be executed by the control unit 31-2 at the site 2.

In Step S1101, upon detection that the coordinate information on the two points are updated while the semitransparent screen 10 are touched at the two points, the detection unit 34-1 transmits the updated coordinate information to the control unit 31-1. The control unit 31-1 calculates the amount of enlargement or reduction based on the coordinate information on the two points before and after the update.

Figure 12A:
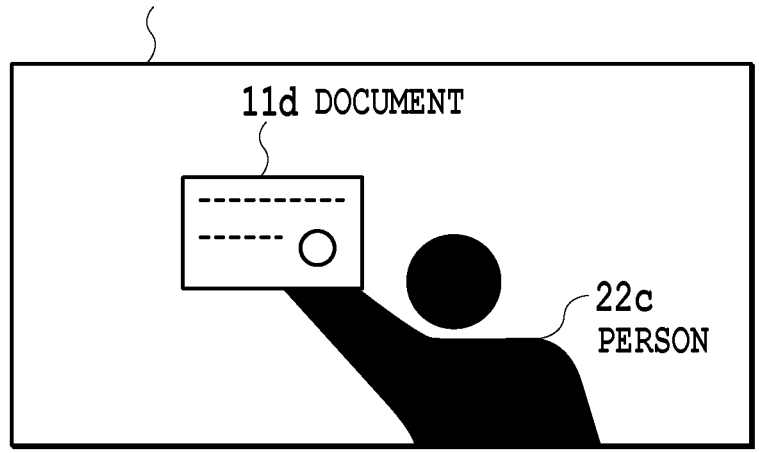
FIGS. 12A and 12B show an example of images projected as a result of the enlarging/reducing processes in Embodiment 3.

In Step S1102, based on the calculated amount of enlargement or reduction, the control unit 31-1 updates the display size of the document image with the center coordinates of the displayed document image used as the origin, and instructs the projection unit 33-1 to project the document image in the updated display size. In response to the projection instruction, the projection unit 33-1 projects the document image on the semitransparent screen. To illustrate the effect of this process, the document image 11a in FIG. 1A is enlarged and displayed as a document image 11d in FIG. 12A.

In Step S1103, the control unit 31-1 updates the display size of the displayed person video by the same amount of enlargement or reduction of the document image with the center coordinates of the document image used as the origin, and instructs the projection unit 33-1 to project the person video in the updated display size. In response to the projection instruction, the projection unit 33-1 projects the person video on the semitransparent screen. To illustrate the effect of this process, the on-screen person 22b in FIG. 1A is enlarged and displayed as an on-screen person 22c shown in FIG. 12A.

In Step S1104, the control unit 31-1 transmits the calculated amount of enlargement or reduction to the control unit 31-2 at the site 2.

Figure 12B:
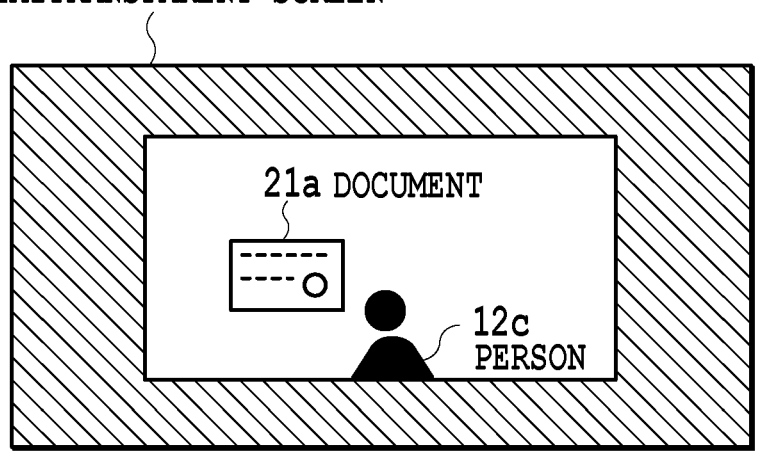

In Step S1151, the control unit 31-2 at the site 2 receives the amount of enlargement or reduction from the control unit 31-1 at the site 1. Using the reciprocal of the amount by which the control unit 31-1 has enlarged or reduced the document image, the control unit 31-2 updates the display size of the person video with the center coordinates of the document image used as the origin. The control unit 31-2 then instructs the projection unit 33-2 to project the person video in the updated display size. In response to the projection instruction, the projection unit 33-2 projects the person video on the semitransparent screen. To illustrate the effect of this process, the on-screen person 12b in FIG. 1B is reduced and displayed as an on-screen person 12c in FIG. 12B. The hatched area in FIG. 12B is an area newly formed on a peripheral area as a result of the reduced display of the person video. A video can be displayed in this area but there is no video to display in the area since it is outside the image capturing range of the image capture unit 32-2. Note that the display coordinates and size of the document image 21a displayed in FIG. 12B remain unchanged from those in FIG. 1B.

Upon detection that the operator has stopped touching the semitransparent screen at the two points, the detection unit 34-1 notifies the control unit 31-1 that his or her hand is released. In response to the notification, the control unit 31-1 determines that the document-image enlarging/reducing process is finished, and notifies the control unit 31-2 of that information. The control unit 31-1 ends the above iterative processing.

<Document-Image Moving Process>

In this embodiment, in a case where the document-image moving process explained in Embodiment 1 is performed in response to an instruction to perform a document-image moving process, the moving process is performed by changing the amount of movement to an amount obtained by multiplying the amount of movement by the percentage of enlargement or reduction. In this way, superimposed display without inconsistency is possible.

As described above, in response to an instruction to enlarge or reduce the document image at the site 1, the document image and the person video at the site 1 are displayed such that both of them are enlarged or reduced by the same amount. Here, in a case where the document image is enlarged and displayed at the site 1, only the person video is reduced and displayed at the site 2. Conversely, in a case where the document image is reduced and displayed at the site 1, only the person video is enlarged and displayed at the site 2.

In this way, it is possible to perform superimposed display without inconsistency while also displaying the document of the electronic document in a desired size at each site.

Other Embodiments

A process similar to the process of switching the document-image moving mode described in Embodiment 2 may be added to the enlarged/reduced display process described in Embodiment 3. This allows the changing of the sizes of the document images displayed at the site 1 and the site 2 in synchronization with each other, addition to the effect described in Embodiment 3.

In each of the above embodiments, the example has been explained in which: the direction and amount of movement of the document image are transferred from the site 1 at which a process of moving (including enlargement or reduction) the document image is performed, to the different site 2; and at this site 2, upon receipt of the direction and amount of movement of the document image, a process of moving the person video by the amount of movement but in the direction opposite the direction of movement is performed. Note, however, that the present invention is not limited to such processes. For example, the information sent from the site 1 to the site 2 does not have to be the direction and amount of movement of the document image. Specifically, in the case where the document-image moving mode is the individually moving mode, the control unit 31-1 at the site 1 can determine that the process to be performed at the site 2 is not a document-image moving process but a person-video moving process. Then, based on the result of that determination, the control unit 31-1 at the site 1 may perform a process of transferring an instruction to move the person video and the direction and amount of this movement to the control unit 31-2 at the site 2. That is, instead of performing a process of transferring information related to movement of the document image at its own site to the site 2, the control unit 31-1 at the site 1 may perform a process of transferring information related to movement of the person video at the other site (site 2) to the site 2.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009705, filed Jan. 21, 2015, which is hereby incorporated by reference herein in its entirety.

What is claimed is:

1. A communication system, comprising: a first site and a second site,
   the first site at least arranging:
     a first projection unit configured to project a first image on a first screen;
     a first control unit configured to control a position on which the first projection unit projects an image; and
     a first image obtain unit configured to obtain an image of a user situated to face a display surface of the first screen,
   the second site at least arranging:
     a second projection unit configured to project the first image and a second image on a second screen, the second image being a mirror image based on image data of a user obtained by the first image obtain unit;
     a second control unit configured to control a position on which the second projection unit projects an image; and
     a detection unit configured to detect an instruction from a user,
   wherein the second control unit (1) obtains a direction and an amount of movement of the first image in a case where the detection unit detects an instruction to move a display position of the first image projected on the second screen and (2) controls to move the second image projected by the second projection unit according to the obtained direction and the amount of movement and
   wherein the first control unit controls not to move the first image projected on the first screen if the display position of the first image projected on the second screen is moved.

2. The communication system according to claim 1, wherein
   the second site further arranges a second image obtain unit configured to obtain an image of a user situated to face to a display surface of the second screen,
   wherein,
     the first projection unit projects a third image on the first screen, the third image being a mirror image based on image data of a user obtained by the second image obtain unit,
     the second control unit controls to transmit the obtained direction and the amount of movement to the first site, and
     the first control unit controls to move the third image projected on the first screen based on the obtained direction and the amount of movement received from the second site.

3. The communication system according to claim 2, wherein the first control unit controls to invert the obtained direction received from the second site.

4. The communication system according to claim 3, wherein,
   the system has (1) a first mode in which the display position of the first image projected on the first screen at the first site and the second screen at the second site is set individually and (2) a second mode in which the display position of the first image projected on the first screen at the first site and the second screen at the second site is set in synchronization, and
   in a case where the communication system is set to the first mode,
     the second control unit controls to move the second image projected on the second projection unit according to the direction and the amount of movement obtained by detecting the instruction to move the display position of the first image projected on the second screen by the detecting unit, and
     the first control unit controls to not move the first image projected on the first screen.

5. The communication system according to claim 4, wherein,
   in a case where the communication system is set to the second mode,
     the second control unit controls (1) to transmit the obtained direction and the amount of movement to the first site and (2) not to move the second image projected by the second projection unit according to the obtained direction and the amount of movement, and
     the first control unit controls to move the first image projected on the first screen based on the obtained direction and the amount of movement received from the second site.

6. The communication system according to claim 4, wherein the first site further arranges a differential detecting unit configured to detect an instruction of a user, and wherein,
   in a case where the communication system is set to the first mode, the first control unit (1) obtains a direction and an amount of movement of the first image based on a detection of an instruction to move a display position of the first image projected on the first screen and (2) controls to move the third image projected by the first projection unit according to the obtained direction and the amount of movement by the differential detecting unit.

7. The communication system according to claim 6, wherein,
   the first control unit controls to transmit the obtained direction and the amount of movement to the second site, and
   the second control unit controls to move the second image projected on the second screen according to the obtained direction and the amount of movement received from the first site.

8. The communication system according to claim 7, wherein the second control unit controls to invert the obtained direction received from the first site.

9. The communication system according to claim 6, wherein,
   in a case where the communication system is set to the second mode,
     the first control unit (1) obtains a direction and an amount of movement of the first image by detecting an instruction to move a display position of the first image projected on the first screen by the differential detection unit, (2) controls to transmit the obtained direction and the amount of movement to the second site and (3) controls not to move the third image projected by the first projection unit according to the obtained direction and the amount of movement, and the second control unit controls to move the first image projected on the second screen based on the obtained direction and the amount of movement received from the first site.

10. The communication system according to claim 6, wherein the first control unit calculates the direction and the amount of movement of the first image using a coordinate of the first image in the first screen before moving and a coordinate of the first image in the first screen after the movement.

11. The communication system according to claim 1, wherein the second control unit calculates the direction and the amount of movement of the first image using a coordinate of the first image in the second screen before moving and a coordinate of the first image in the second screen after the movement.

12. The communication system according to claim 1, wherein,
the first screen is a semitransparent screen, and
the first image obtaining unit obtains the image of the user through the semitransparent screen from a back surface side of the semitransparent screen facing away from the user.

13. The communication system according to claim 2, wherein,
the second screen is a semitransparent screen, and
the second image obtaining unit obtains the image of the user through the semitransparent screen from a back surface side of the semitransparent screen facing away from the user.

* * * * *